US012518665B2

(12) United States Patent
Lam et al.

(10) Patent No.: US 12,518,665 B2
(45) Date of Patent: Jan. 6, 2026

(54) ON-CHIP OPEN, SHORT, AND LED VOLTAGE DETECTION METHOD FOR MICROLED OR MICROOLED

(71) Applicant: OMNIVISION TECHNOLOGIES, INC., Santa Clara, CA (US)

(72) Inventors: Hing Mo Lam, Santa Clara, CA (US); Sunny Yat-San Ng, San Jose, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 0 days.

(21) Appl. No.: 18/625,618

(22) Filed: Apr. 3, 2024

(65) Prior Publication Data

US 2025/0316196 A1 Oct. 9, 2025

(51) Int. Cl.
*G09G 3/00* (2006.01)
*G09G 3/32* (2016.01)

(52) U.S. Cl.
CPC ............... *G09G 3/006* (2013.01); *G09G 3/32* (2013.01)

(58) Field of Classification Search
CPC ................................ G09G 3/006; G09G 3/32
See application file for complete search history.

(56) References Cited

U.S. PATENT DOCUMENTS 5,394,144 A * 2/1995 Kim ...................... H03M 7/425 341/67
2004/0196049 A1* 10/2004 Yano .................... G09G 3/2085 324/523
2008/0036703 A1* 2/2008 Wang .................. G09G 3/3225 345/76
2011/0141098 A1* 6/2011 Yaguma ............... G09G 3/3696 345/212
2013/0147375 A1* 6/2013 Williams ............. H05B 45/397 315/192
2018/0041218 A1* 2/2018 Sato ..................... H04N 25/616

* cited by examiner

*Primary Examiner* — Christopher E Leiby
(74) *Attorney, Agent, or Firm* — CHRISTENSEN O'CONNOR JOHNSON KINDNESS PLLC

(57) ABSTRACT

A micro-light-emitting diode (micro-LED) display comprising a plurality of rows of light-emitting diodes (LEDs), each LED of the LEDs in a row including a channel wherein each channel includes a feedback path configured to feed an anode voltage of each LED to an input of a voltage comparator, a column driver comprising a digital to analog converter (DAC) and the voltage comparator, wherein the DAC is configured to receive a plurality of voltage inputs from the resistor ladder and to provide a corresponding plurality of voltage outputs to the input of the voltage comparator, and wherein the voltage comparator is configured to successively compare individual voltage outputs of the plurality of voltage outputs received from the DAC with the anode voltage of each LED, a data latch configured to store comparison results from the voltage comparator.

16 Claims, 11 Drawing Sheets

ON-CHIP OPEN, SHORT, AND LED VOLTAGE DETECTION METHOD FOR MICROLED OR MICROOLED

BACKGROUND INFORMATION

Field of the Disclosure

This disclosure relates generally to the design of micro-light emitting diode (micro-LED) displays, and in particular, an on-chip component of a micro-LED display panel and methods thereof for detecting an open circuit, short circuit, and LED anode voltage of the micro-LED display panel.

Background

Micro-LED displays are widely used in augmented/mixed reality (AR/MR), virtual reality (VR), large video displays, TVs and monitors, automotive displays, mobile phones, smart watches and wearables, tablets, laptops and other applications. The technology for manufacturing micro-LED displays continues to advance at a great pace. For example, demands for micro-LED displays having smaller pixels that are closer together for greater image quality motivate further miniaturization and integration of micro-LEDs in display devices.

Micro-LED screens are made up of micrometer-sized LED lights. These lights are used to directly create color pixels. By having thousands or more LED lights, high-quality images and video may be displayed without the need for backlighting.

As the size of LEDs is reduced to the μm-level, the LED fabrication process becomes increasingly challenging. LED manufacturers face issues of low quantum efficiency (or luminance efficiency vs driving current) and luminance uniformity of micro-LEDs on a display panel.

Additionally, Mura, or the visual unevenness on a display panel can also cause issues with the micro-LED display panel. Mura can cause unpleasant feelings, such as nausea, and thus a Mura inspection is carried out during display quality tests.

Accordingly, device and methods for detecting open circuits, short circuits, and errors in LED anode voltage are needed.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
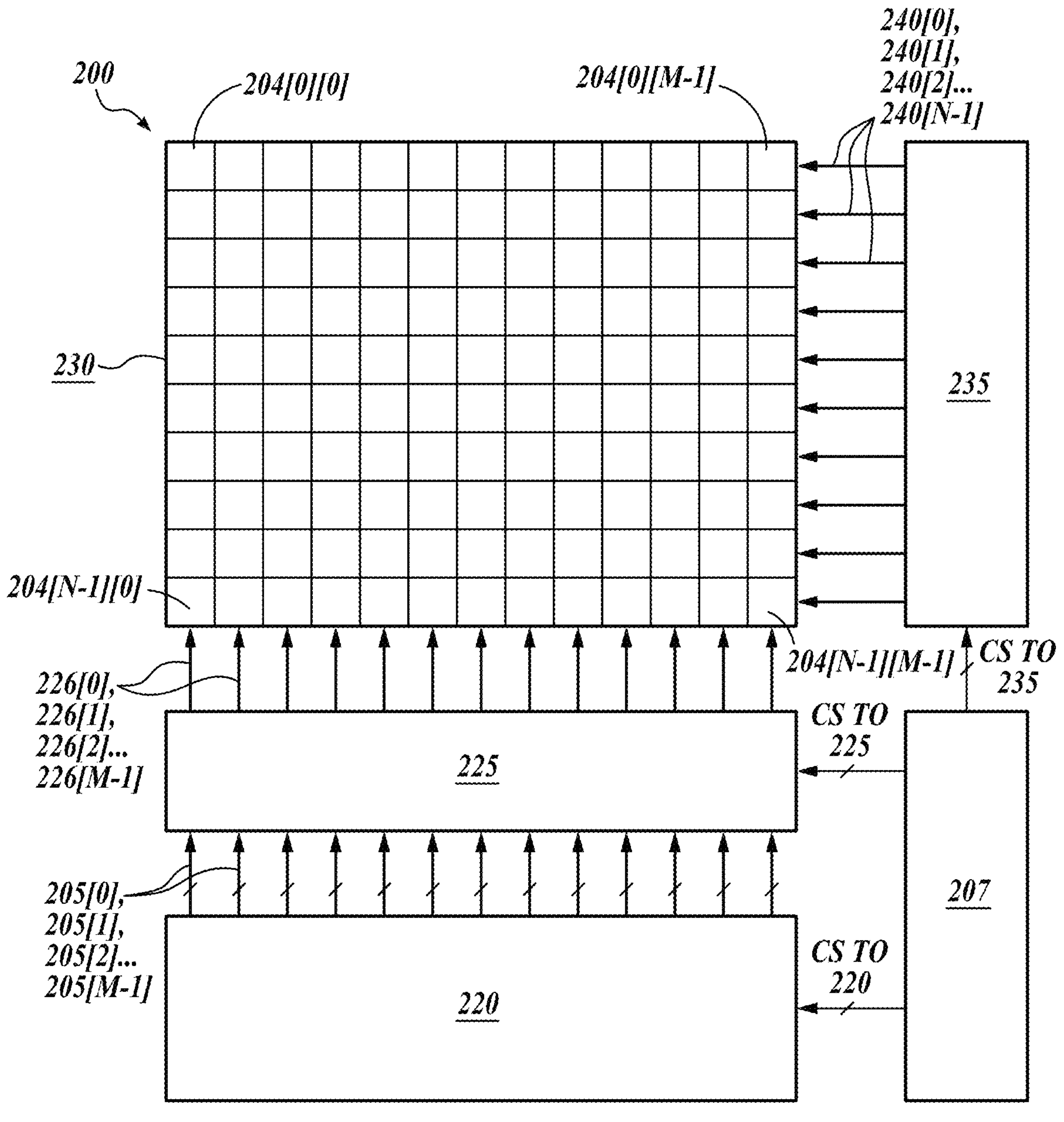
FIG. 1 is an example micro-light emitting diode (micro-LED) display system, in accordance with the present technology.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Disclosed herein are micro-LED display panels and associated methods to detect open/short and anode voltage of micro-LEDs with minimal additional hardware. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Where methods are described, the methods may include more, fewer, or other steps. Additionally, steps may be performed in any suitable order. Accordingly, the disclosure can encompass other embodiments not expressly shown or described herein. In the context of this disclosure, the terms "about," "approximately," etc., mean +/−5% of the stated value.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

Briefly, disclosed herein are on-chip components for micro-LED display panels, and related methods for determining whether a micro-LED display panel is operational. Also disclosed herein is an on-chip silicon backplane configured to detect the open, short and anode voltage of a micro-LED can help LED manufacturers to diagnose their LED fabrication problems and is needed. The on-chip microLED anode voltage detection can also be used to collect Mura (non-uniformity caused by process) data of a microLED display panel without optical equipment. This Mura data can be used by the on-chip de-Mura module to correct or at least minimize Mura.

In some embodiments, a resistor ladder may output a plurality of voltage inputs to a digital to analog converter (DAC). The DAC may in turn output a plurality of voltage outputs corresponding to these voltage inputs to a voltage comparator. Similarly, a feedback path may feed an anode voltage into each LED of a plurality of LEDs on the micro-LED display panel. The anode voltage may then also be output to the voltage comparator. The voltage comparator sequentially compares the voltage outputs from the DAC and the anode voltage of the LED, stores the comparison results to a data latch, and then transfers these data results to an LED detect module. In some embodiments, the LED detect module accumulates the comparison results as a 5-bit data result. In other embodiments, the LED detect module serially shifts previously stored results to a next bit location before a new result (i.e., a new comparison data) is stored. In this manner, the LED detect module may determine if the micro-LED display panel is operational, based on the comparison results.

FIG. 1 is an example micro-light emitting diode (micro-LED) display system 200, in accordance with the present technology. The micro-LED display 200 includes a frame buffer 220, a bitplane generator 225, a micro-LED display panel 230, a timing controller 207, and a wordline gate driver 235. The micro-LED display panel 230 includes an N×M array of pixels 204[0][0] . . . 204[N−1][M−1]. In the illustrated example, indices n, m correspond to the row and column of pixel circuit in the array of pixel circuits. For the array of pixel circuits N×M, these indices range from 0 to N−1 for the index n, and from 0 to M−1 for the index m.

Each column 204[0][m] . . . 204[N−1][m] of pixels 204 includes a corresponding data line 226[m] (also referred to herein as a bitline). Each row 204[n][0] . . . 204[n][M−1] of pixels 204 includes a corresponding scan line 240[n] (also referred to herein as a wordline).

The timing controller 207 is configured to transmit control signals (CS) to the frame buffer 220, the bitplane generator 225, and the wordline gate driver 235. The frame buffer 220 receives and stores display data.

In display operation, the frame buffer 220 then transmits display data 205[0] . . . 205[M−1] to the bitplane generator 225 row by row. In some embodiments the display data of each pixel is an 8-bit binary number; however, it will be appreciated that the display data can be a 10-bit binary number or a binary number of any other suitable bit width. The frame buffer 220 may be a static random-access memory (SRAM), dynamic random-access memory (DRAM), or other type of storage element. The frame buffer 220 may transmit data representing all of the pixels 204[0][0] . . . 204[N−1][M−1] in a complete display panel 230.

The bitplane generator 225 converts display data into an image signal or video signal that can be displayed on a monitor, screen, or other display. The bitplane generator 225 receives the display data 205[0] . . . 205[M−1] from the frame buffer 220. The display data 205[0] . . . 205[M−1] is a gray level of each pixel on the display panel 230. The gray level directs the bitplane generator 225 to adjust the luminance of one or more LEDs of each pixel 204 in the display panel 230. The bitplane generator 225 is configured to generate bitplanes. All the generated bitplanes in a period of one frame form a pulse width modulation (PWM) of all pixels 204 on the display panel 230.

Conventionally, each micro-LED in micro-LED display 200 requires an optimal current to drive, for maximum (quantum) efficiency. The display 200 includes a constant current source to generate the optimal current, then uses PWM, such as the GPWM signal generated by the bitplane generator 225, to control the brightness of 8-bit grayscales of the display data 205[0] . . . 205[M−1].

In order to display an image or video, the bitplane generator 225 sequentially reads out all rows of data (such as 1024 rows) from the frame buffer 220 and switches all bitlines 226[0] . . . 226[M−1] to sequentially write bitplane data onto each row of the pixel array. Conventionally, there is not enough time to switch the bitlines 226[0] . . . 226[M−1] fast enough to accommodate 10-bit dimming after adjusting the luminance of 8-bit grayscale with the bitplane generator 225, because of the impedance of the bitlines 226[0] . . . 226[M−1]. This becomes even more difficult for higher resolution and higher frame rate displays. Switching the bitline 226[0] . . . 226[M−1] also consumes large amounts of power.

In operation, the frame buffer 220 provides display data to the bitplane generator 225. The wordlines 240[0] . . . 240[N−1] select a row of pixels 204[0][0] . . . 204[N−1][M−1] for the bitlines 226[0] . . . 226[M−1] to write to. In some embodiments, the bitplane generator 225 outputs a binary 8-bit grayscale pulse width modulation (GPWM) signal for each pixel on the micro-LED display panel 230 through multiple bitplanes. In this manner, each pixel 204 of the micro-LED display panel 230 is turned on or off according to its value on the bitplane, and the luminance of 8-bit grayscale of each pixel is adjusted.

The full display operation is as follows. The timing controller 207 controls the overall display operation of the display system 200. The timing controller also may control when and what data is going to be written into the pixel circuits 204. The timing controller 207 outputs control signals CS (row address, row address enable, clock) to the wordline gate driver 235, the wordline gate driver 235 turns on (or enables) a row of pixel circuits 204[n][0] . . . 204[n][M−1] via scan lines (or wordlines) 240[0] . . . 240[N−1] for writing in display data on the data lines 226[0] . . . 226[M−1]. At the same time, the timing controller 207 also outputs control signals CS (clock, output enable) to the bitplane generator 225 (or source driver if the display panel 230 is analog driven) to output display data to the data lines 226[0] . . . 226[M−1]. The gray scale (or display data) on the data lines 226[0] . . . 226[M−1] is written into the pixel circuits 204[0][0] . . . 204[N−1][M−1] selected by the scan lines 240[0] . . . 240[N−1]. The gate driver 235 turns off (or disables) the row of pixel circuits 204[0][0] . . . 204[N−1][M−1] after writing the bitplane data into the selected row of pixel circuits 204[0][0] . . . 204[N−1][M−1] is finished, and before removing the bitplane data on the data lines 226[0] . . . 226[M−1]. The is repeated for the next row of pixel circuits till the last row of pixel circuits of the display panel 230.

Figure 2:
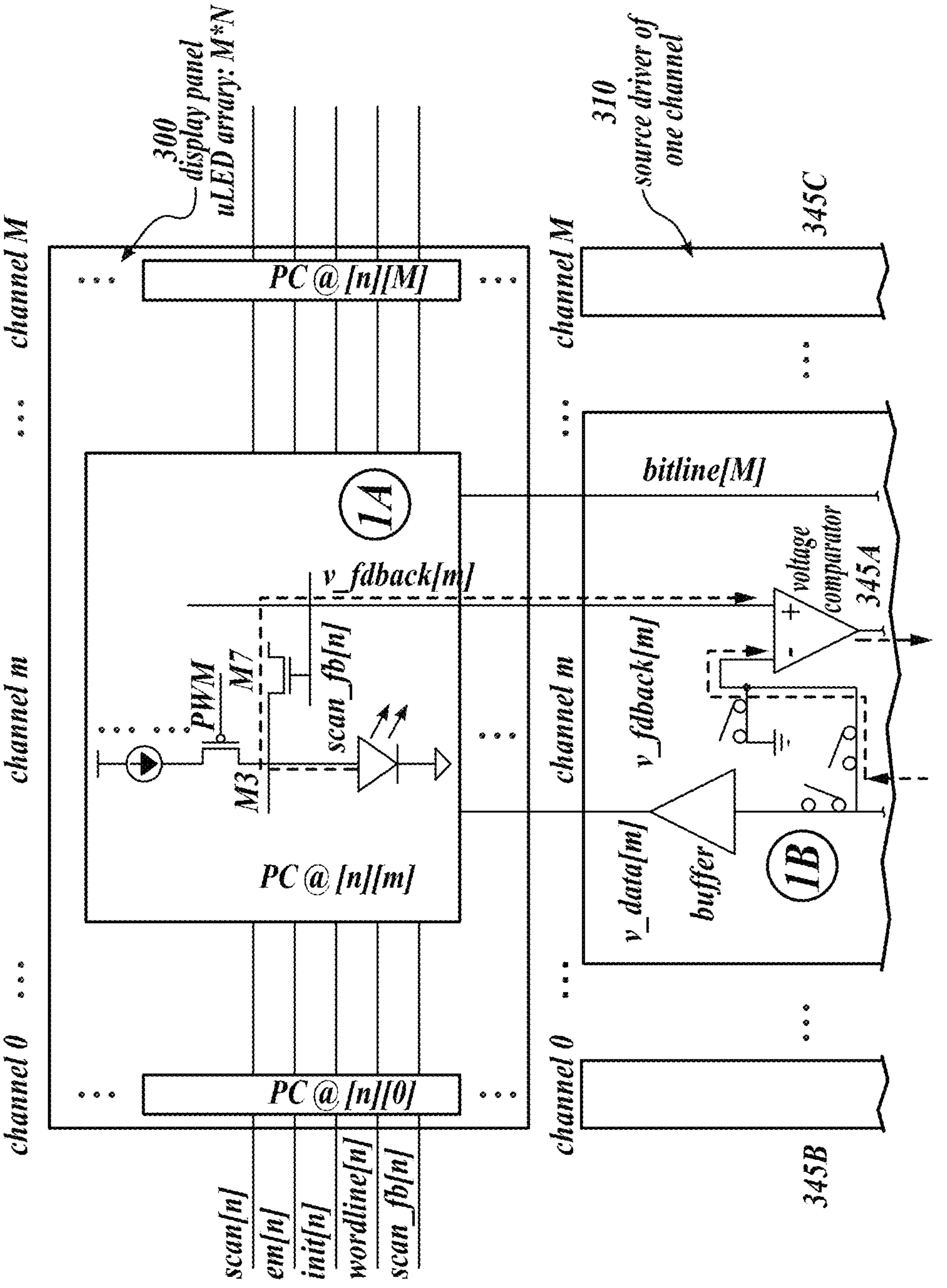
FIG. 2 is an example portion of a micro-LED display system, in accordance with the present technology.
Figure 2:
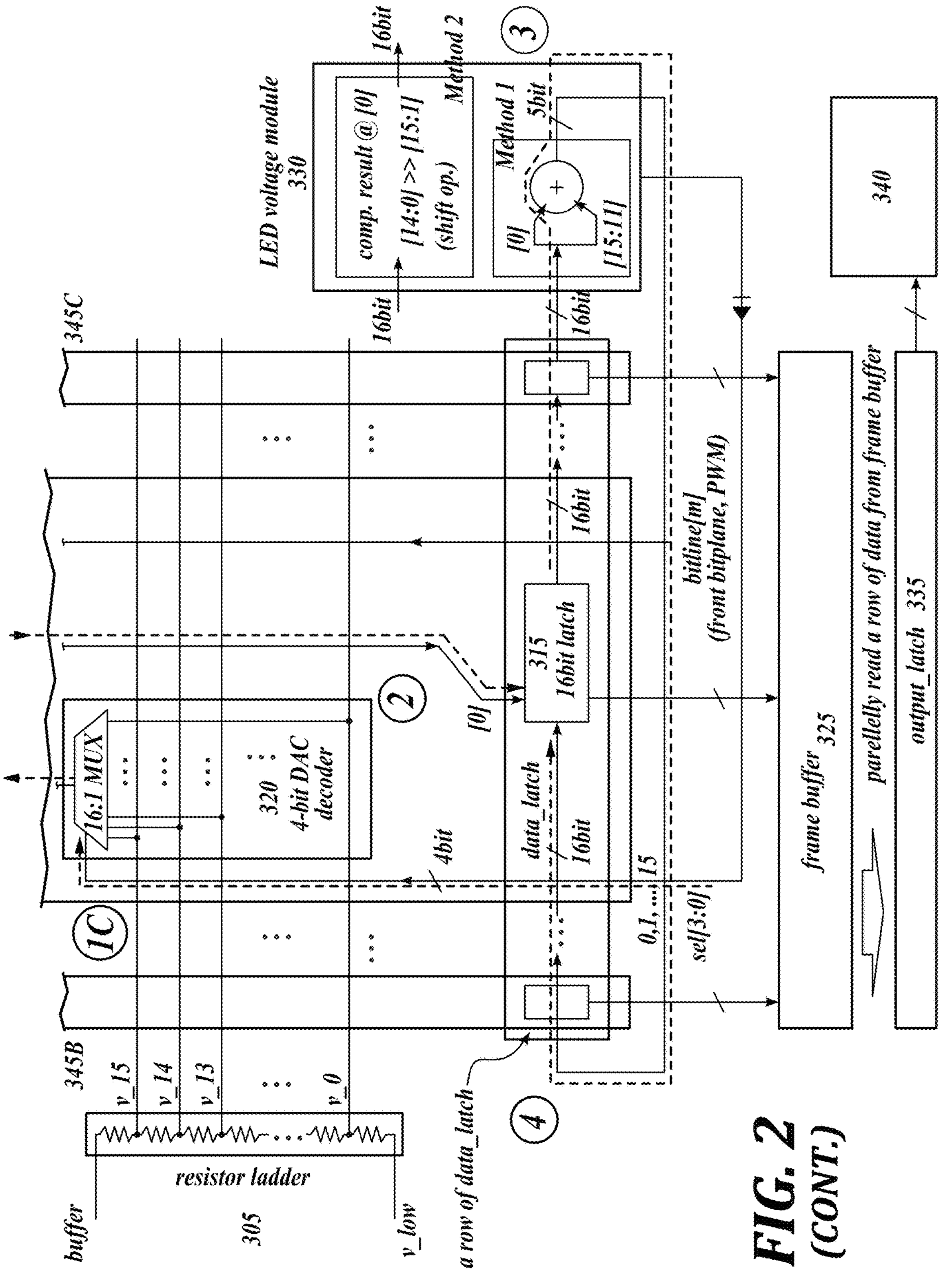

FIG. 2 is an example portion of a micro-LED display system 300, in accordance with the present technology. In some embodiments, the micro-LED display system 300 (also referred to herein as a micro-LED display panel) includes a resistor ladder 305, a plurality of rows of LEDs (as shown in FIG. 1), and an LED detect module 330 configured to determine whether the micro-LED display panel 300 is operational based on comparison results as described herein. FIG. 2 shows only a portion of the micro-LED display panel 300, including a close-up view of a single channel (channel m) of a row of LEDs. Also shown is a frame buffer 325, an output latch 335, and a serial bus 340.

In some embodiments, the resistor ladder 305 is configured to output a plurality of voltage inputs to the DAC 320. In some embodiments, the resistor ladder is configured to sweep a plurality of voltage inputs sequentially, that is, from a lowest voltage to a highest voltage. In some embodiments, the resistor ladder 305 is configured to output sixteen voltage inputs (v_0 to v_15) in the increments that are determined by the values of the electrical resistances of the resistor ladder 305.

Each LED of the row of LEDs belongs to a certain column of LEDs (also referred to as "a channel" in the range of channel 0, . . . , channel m, . . . , channel M). Each channel (channel 0 to channel M) may include a feedback path (as shown and described in detail in FIGS. 3A-3B), a column driver (or source driver) 310, a digital to analog converter (DAC) 320 and a voltage comparator 345, and a data latch 315.

In some embodiments, the feedback path includes a transistor M7 and outputs a signal v_fdback[m]. The feedback path may feed an anode voltage to the LED. In some embodiments, the fed back anode voltage is then transmitted to the voltage comparator 345A, as shown by the dashed arrow at element 1A.

In some embodiments, the DAC 320 is a 4-bit DAC decoder. In some embodiments, the DAC 320 is a digital-to-analog converter configured to convert a binary number into an equivalent analog output signal proportional to the value of the binary number. In some embodiments, the DAC 320 receives the plurality of sequential voltage inputs (v_0 to v_15) from the resistor ladder 305, binary number sel[3:0] (arrow 1C), and depends on the value of sel[3:0] it select a voltage from v_0 to v_15 and outputs a voltage outputs to the voltage comparator 345A (arrow 1B). In some embodiments, the plurality of voltage outputs is sixteen voltage outputs, corresponding to sixteen voltage inputs (v_0 to v_15) from the resistor ladder 305.

In some embodiments, the voltage comparator 345A receives the fed back anode voltage of the LED (arrow 1A) and one voltage outputs from the DAC 320 (arrow 1B). The voltage comparator 345A may then compare the anode voltage with the selected one voltage outputs from the DAC 320 to generate comparison results. In some embodiments, each comparison result corresponds to a voltage output of the plurality of voltage outputs received from the DAC 320. The voltage comparator 345A may then transfer these comparison results to the data latch 315 (arrow 2). In some embodiments, the comparison results are 1-bit. In such embodiments, each bit of the comparison results corresponds to an individual comparison between one of the sixteen output voltages of the DAC 320 and a fed back anode voltage of the LED.

In some embodiments, the data latch 315 receives and stores the comparison results. In some embodiments, the detect module 330 is the module labeled "Method 1." In some embodiments, the detect module 330 is the module "Method 2." While module Method 1 is illustrated as receiving the comparison results from the data latch 315, it should be understood that in some embodiments, module Method 2 receives the comparison results from the data latch 315.

In Method 1, an adder is used to sum up all 16 comparison results into 1 number. Accordingly, the results of Method 1 is a 5-bit comparison result at the end.

In Method 2, each bit in the 16-bit latch 315 stores one comparison result. The comparison may be carried out 16 times because of the 16 different voltages (v_0, v_1, . . . v_15) output by the resistor ladder to compare. In some embodiments, one comparison will produce a 1-bit result. Accordingly, there are sixteen comparisons that result in 16-bit comparison results at the end of Method 2. In some embodiments, the comparison results are first stored at bit-0 of the 16-bit latch. The comparison results may then be serially shifted to the LED detect module 330 (arrow 3).

The comparison results (as shown and explained in detail in FIG. 3C) may be used to determine whether the micro-LED display is operational. One skilled in the art should understand that module Method 1 and module Method 2 are alternatives, and not both operating on a single micro-LED display panel 300 simultaneously.

In operation, the feedback path is configured to feed an anode voltage to an LED of the row of LEDs, as shown by the dashed arrow at 1A of FIG. 2. The feedback path is shown in greater detail in FIGS. 3A-3B. In some embodiments, the DAC 320 is configured to receive a plurality of voltage inputs from the resistor ladder 305 and according to the value of sel[3:0] to select one voltage out of 16 voltages from resistor ladder 305 and then outputs to the voltage comparator 345A (as shown by the dashed arrows at 1C and 1B in FIG. 2). In some embodiments, the voltage comparator 345A is configured to successively compare individual voltage outputs of the plurality of voltage outputs received from the DAC with the anode voltage of the LED. The data latch 315 may then store comparison results from the voltage comparator 345A. In some embodiments, the input of DAC is sel[3:0], the output of DAC is according to the value of sel[3:0] pick one voltage from v_0, . . . , v_15.

In some embodiments, this process is repeated for each LED in the row of LEDs until comparison results are obtained for all voltage outputs (v_0 . . . v_15) from the DAC 320. The processed results may then be transferred into the frame buffer 325. This may be repeated for every row of LEDs in the micro-LED display panel.

After finishing the LED detection of all rows of LEDs on the micro-LED display panel, the comparison results may be transferred off-chip through a serial bus 340 for a next stage of the LED diagnosis process.

Figure 3A:
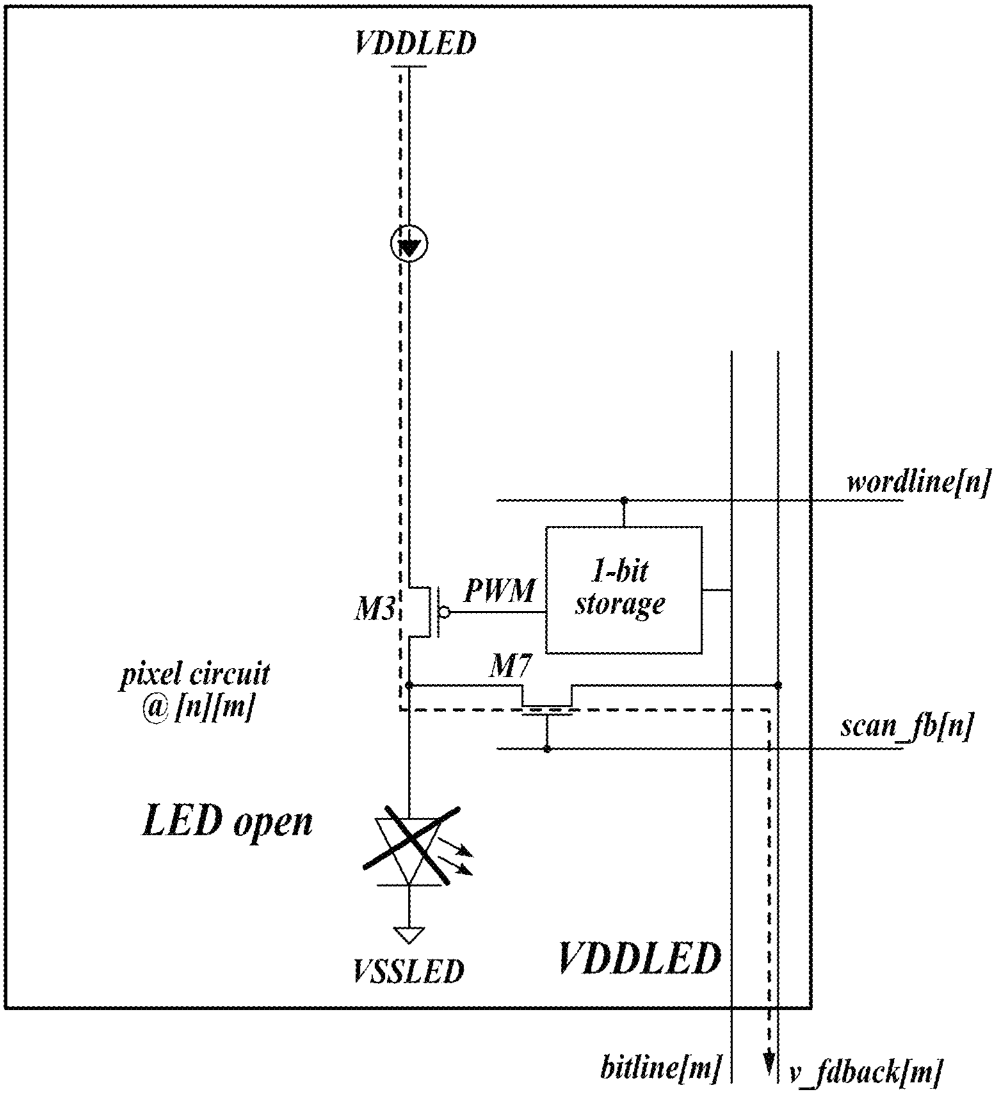
FIGS. 3A-3B are example conditions of an LED of the micro-LED display system of FIG. 2, in accordance with the present technology.
Figure 3B:
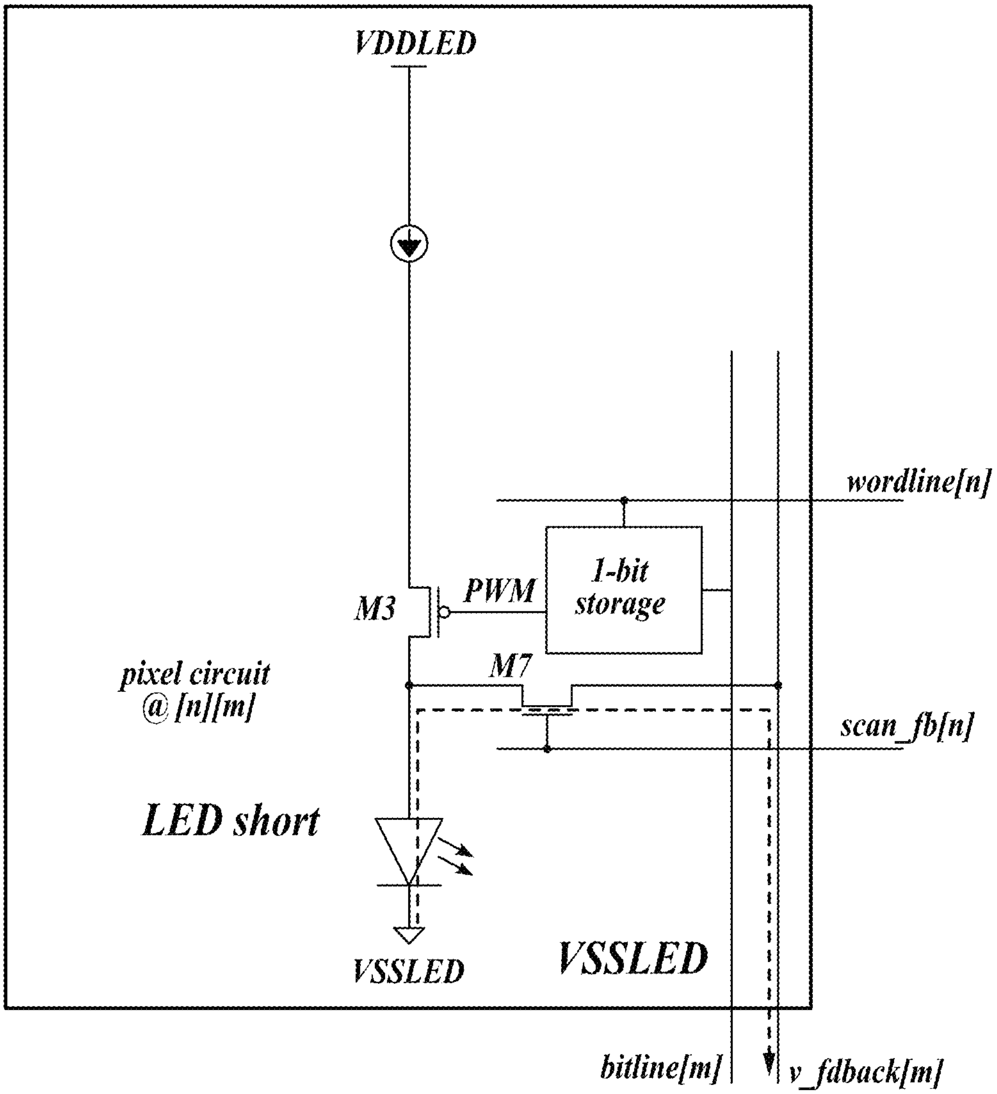

FIGS. 3A-3B are example conditions of an LED of the micro-LED display system of FIG. 2, in accordance with the present technology. In some embodiments, the comparison results are used to detect a fault or condition of the micro-LED display panel. Example faults/conditions include an open circuit (as shown in FIG. 3A and described in FIG. 3C), a short circuit (as shown in FIG. 3B and described in FIG. 3C), and/or a voltage "bubble" (as shown and described in FIG. 3C). In some embodiments, one or more of these faults/conditions in the comparison results declares the micro-LED display as not operational. For example, if a short circuit is detected, the micro-LED display panel may be declared not operational.

Figure 3C:
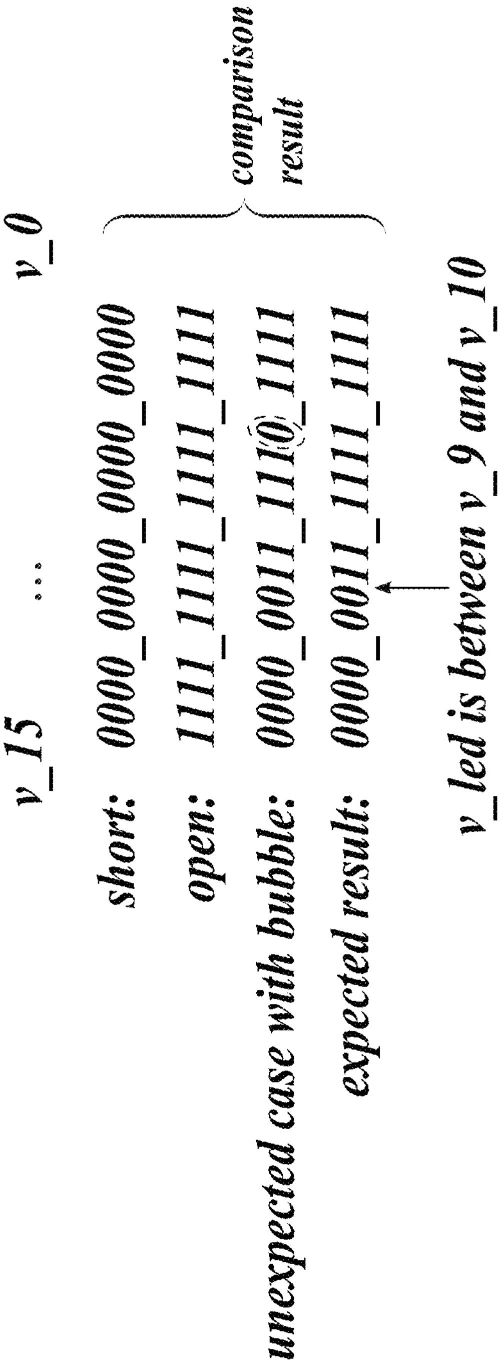
FIG. 3C shows example comparison results of an LED detect module, in accordance with the present technology.

FIG. 3A is an example of an open circuit, in accordance with the present technology. As illustrated in FIG. 3A, the LED is open (as indicated by the "X"). Accordingly, a high voltage (close to VDDLED) will be fed back to the voltage comparator (such as voltage comparator 345A). Therefore, the comparison results will all be "1" as shown in FIG. 3C. In some embodiments, an open comparison result will lead to the micro-LED display panel being declared as not operational.

FIG. 3B is an example of a short circuit, in accordance with the present technology. If the LED is shorted, a low voltage (close to VSSLED) will be fed back to the voltage comparator (such as voltage comparator 345A). Therefore, the comparison results will all be "0" as shown in FIG. 3C. In some embodiments, a short comparison result will lead to the micro-LED display panel being declared as not operational.

FIG. 3C shows example comparison results of an LED detect module, in accordance with the present technology. In some embodiments, the comparison results are 16-bit comparison results.

Also illustrated is the comparison result of an "unexpected case with bubble." A bubble occurs when a voltage is unexpectedly high or unexpectedly low when compared with one or more of the sixteen voltage outputs from a DAC (such as DAC 320). The bubble may be detected when module Method 2 (as shown in FIG. 2) is implemented into the micro-LED display panel. This type of scenario is referred to as a "bubble" because once the comparison value of "0" switches to the comparison value of "1," the comparison value is expected to stay at "1" as the voltage coming from the resistor ladder 305 and DAC 320 decreases. In the case of bubble, because the shifter is able to shift previously stored results to a next bit location before a new result is stored, the comparison results can show this bubble. Therefore, this scenario results in an unexpected "1" or "0" in the comparison results. The bubble in FIG. 3C is the voltage at bit 4 of the comparison result of the unexpected case (circled in FIG. 3C). In some embodiments, the bubble may only be detected when compared to an expected result (also shown in FIG. 3C). The expected result shows a voltage of the LED (v_led) between v_9 and v_10 of the voltage outputs. By comparing the expected result to the unexpected case, the bubble may be detected.

In some embodiments, the micro-LED display is declared as not operational when the comparison results indicate a bubble. The bubble may indicate that the voltage comparator (such as voltage comparator 345A) has malfunctioned. In some embodiments, the bubble indicates an unexpected event. In some embodiments, the micro-LED display is declared as not operational when the comparison results indicate a short circuit. In some embodiments, the micro-LED display is declared as not operational when the comparison results indicate an open circuit. In some embodiments, the micro-LED display is declared as operational when the comparison results correspond to an expected result.

In some embodiments, the bubble may only be detected when the Method 2 module (as shown in FIG. 2) is implemented. In Method 2, the comparison results are shifted to a next bit location of the 16-bit latch (as shown in FIG. 2). So, all sixteen comparison results can be kept in 16-bit latch, through the 16-bit latch and information in FIG. 3C. Because of this, a bubble can be observed. If the bubble is observed, then all sixteen comparison results may not be reliable, as the bubble indicates the voltage comparator is not functioning properly. In contrast, when the Method 1 module is used, an adder sums up all the sixteen comparison results into 5-bit data (from 0 to 16). Accordingly, in Method 1, the bubble cannot be detected.

Figure 4A:
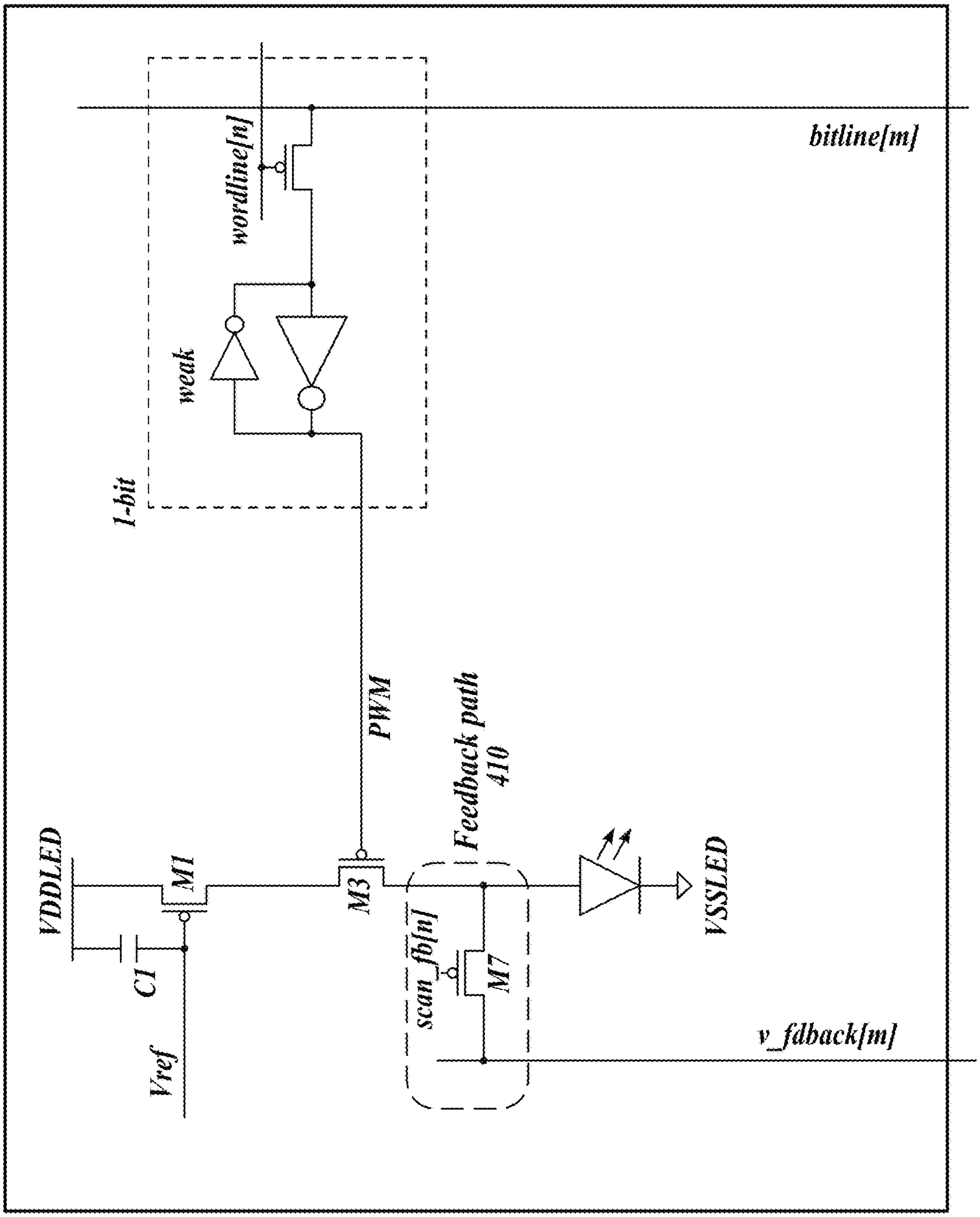
FIGS. 4A-4B are example pixel circuits of the micro-LED display system of FIG. 2, in accordance with the present technology.
Figure 4B:
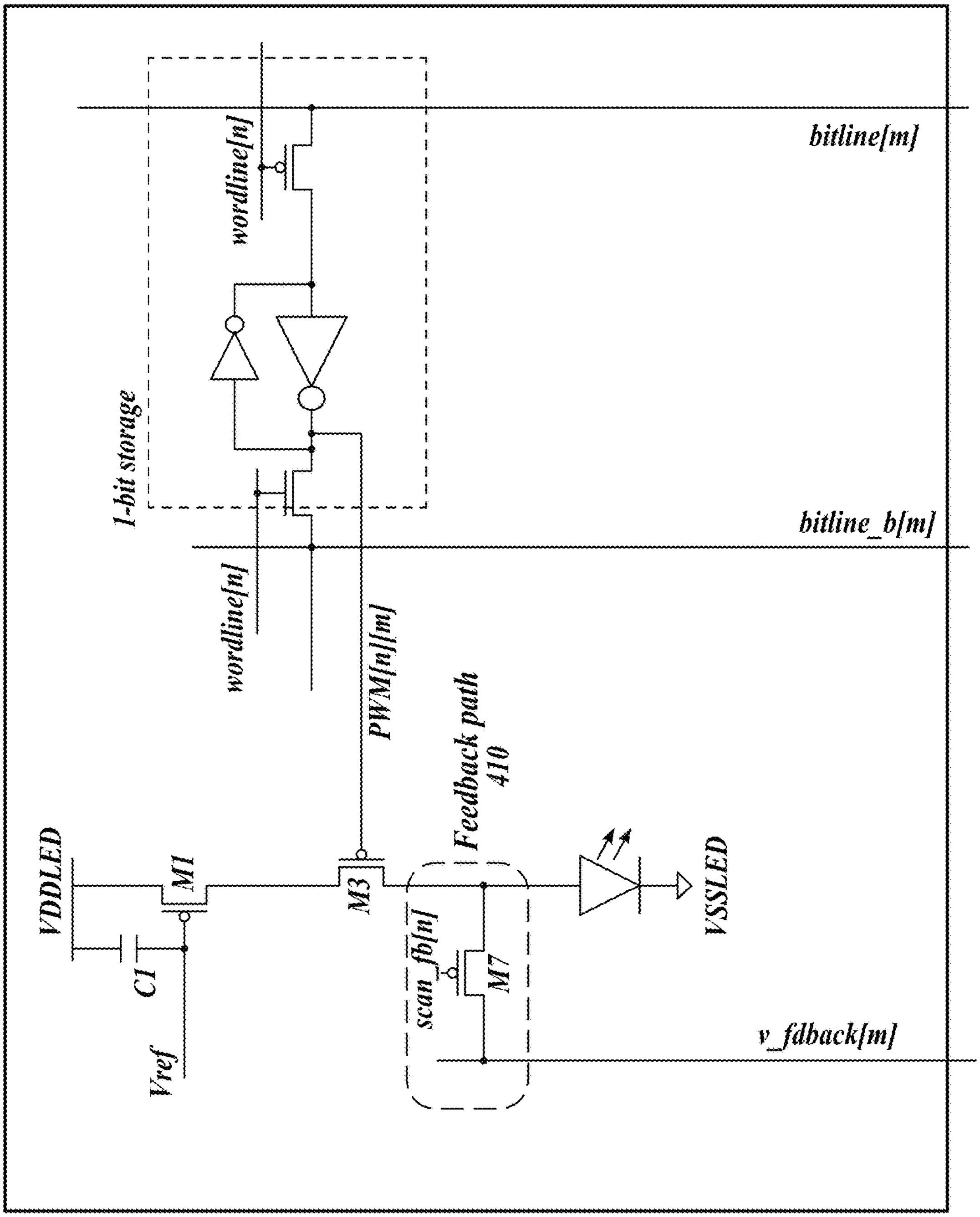

FIGS. 4A-4B are example pixel circuits of the micro-LED display system of FIG. 2, in accordance with the present technology. As shown, in some embodiments, each pixel circuit includes an LED, a pulse width modulation (PWM) signal, and a feedback path 410. In some embodiments, the feedback path 410 includes a transistor. The feedback path 410 may allow a voltage to be fed back to the LED and then transmitted to a voltage comparator (such as voltage comparator 345A). In this regard, an open circuit, short circuit, or anode voltage of the LED may be detected with minimal additional hardware.

Figure 5:
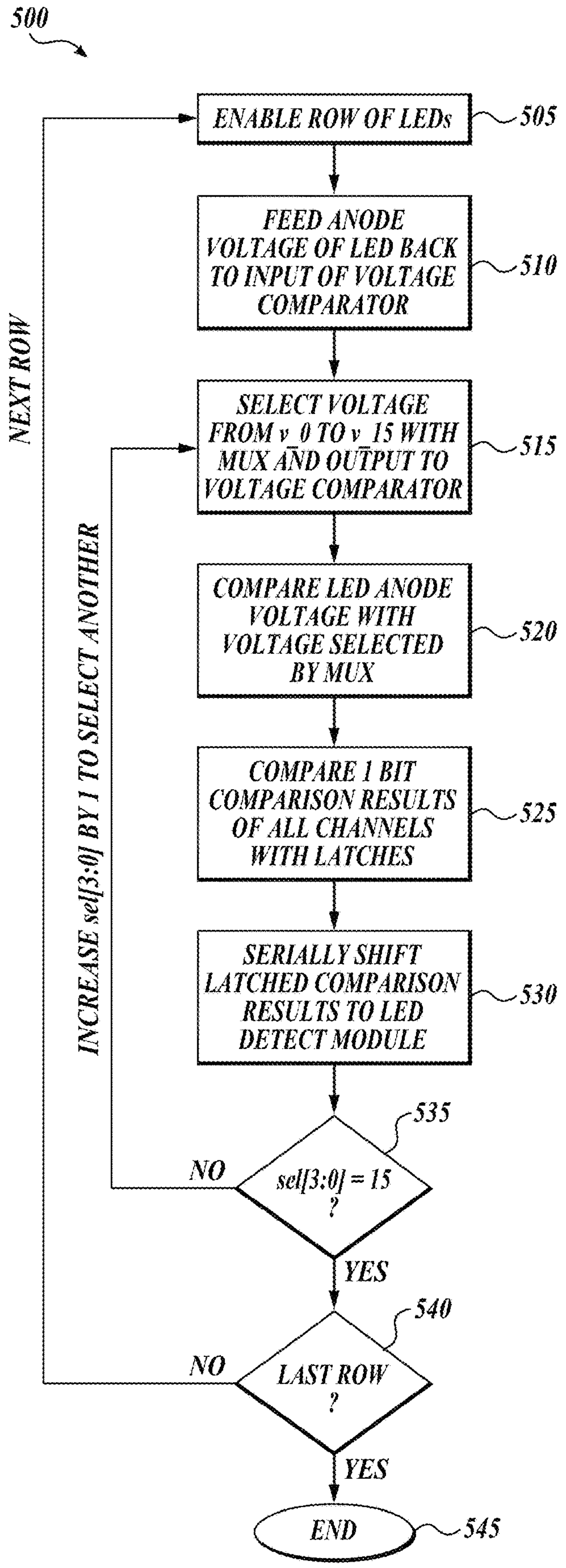
FIG. 5 is a method of detecting a short circuit, open circuit, and/or anode voltage of an LED of a micro-LED display system, in accordance with the present technology.

FIG. 5 is a method 500 of detecting a short circuit, open circuit, and/or anode voltage of an LED of a micro-LED display system, in accordance with the present technology. In some embodiments, the method 500 may be carried out with a micro-LED display panel (such as micro-LED display panel 300), including a plurality of rows of LEDs (as shown in FIG. 1), and an LED detect module (such as LED detector module 330). In some embodiments, each LED of the row of LEDs includes a channel (such as channel 0, channel m, channel M). Each channel may include a feedback path (such as feedback path 410), a column driver (such as column driver 310) including a DAC (such as DAC 320) comprising a resistor ladder (such as resistor ladder 305) and a MUX, a voltage comparator (such as voltage comparator 345A), and a data latch (such as data latch 315). In different embodiments, the method may include additional steps or may be executed with less steps than shown in the flow chart.

In block 505, a row of LEDs is enabled. For each channel (and thus each LED) in the row of LEDs, blocks 510-535 are executed.

In block 510, an anode voltage is fed back to an input of the voltage comparator.

In block 515, the MUX selects one voltage from v_0 to v_15 and outputs to the voltage comparator.

In block 520, the LED anode voltage is selected by the MUX.

In block 525, a 1-bit comparison result of all channels are captured or held by latches. In some embodiments, this generates comparison results. In some embodiments, the comparison results are 16-bit data comparison results for the sixteen voltage outputs of the DAC.

In block 530, the comparison results are serially shifted to the LED detect module. In some embodiments, the data latch is a 16-bit data latch.

In decision block 535, it is determined whether sel[3:0] is equal to 15. If it is determined that sel[3:0] is equal to 15, the method proceeds to block 540.

In decision block 540, it is determined whether this is the last row of LEDs. If it is determined that this is the last row, the method proceeds to block 545.

Returning to decision block 535, if sel[3:0] is not equal to 15, the method returns to block 515. At the same time, sel[3:0] is increased by 1 to select another.

Returning to decision block 540, if it is determined it is not the last row of LEDs, the method returns to block 505 for the next row.

In block 545, the method ends.

Figure 6:
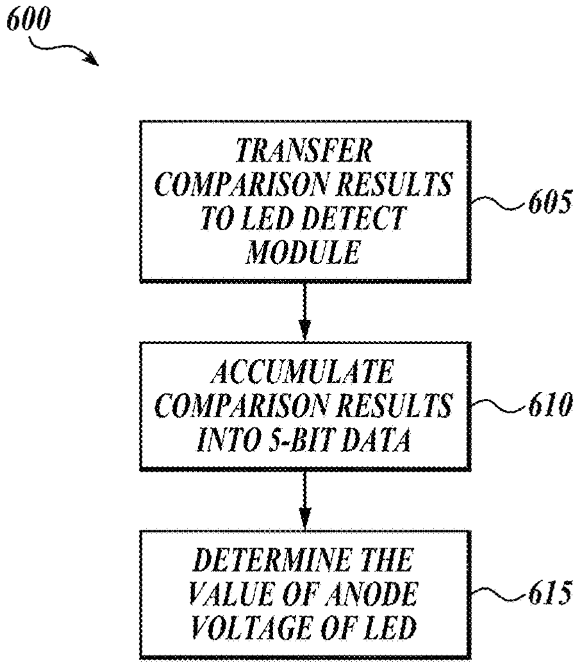
FIG. 6 is another method of detecting a short circuit, open circuit, and/or anode voltage of an LED of a micro-LED display system, in accordance with the present technology.

FIG. 6 is another method of detecting a short circuit, open circuit, and/or anode voltage of an LED of a micro-LED display system, in accordance with the present technology. In some embodiments, the method 600 may be carried out with a micro-LED display panel (such as micro-LED display panel 300), including a resistor ladder (such as resistor ladder 305) a plurality of rows of LEDs (as shown in FIG. 1), and an LED detect module (such as LED detector module 330). In some embodiments, each LED of the row of LEDs includes a channel (such as channel 0, . . . , channel m, . . . , channel M). Each channel may include a feedback path (such as feedback path 410), a column driver (such as column driver 310) including a DAC (such as DAC 320) a voltage comparator (such as voltage comparator 345A), and a data latch (such as data latch 315). In some embodiments, the LED detect module includes an adder (such as module Method 1). The adder may accumulate all of the comparison results into a 5-bit comparison result.

In some embodiments, method 600 occurs after method 500. In different embodiments, method 600 may include additional steps or may be executed with less steps than shown in the flow chart.

In block 605, the comparison results are transferred to the LED detect module.

In block 610, the LED detect module accumulates the comparison results into a 5-bit comparison result. In some embodiments, the LED detect module includes an adder.

In block 615, the value of the anode voltage of the LED is determined.

Figure 7:
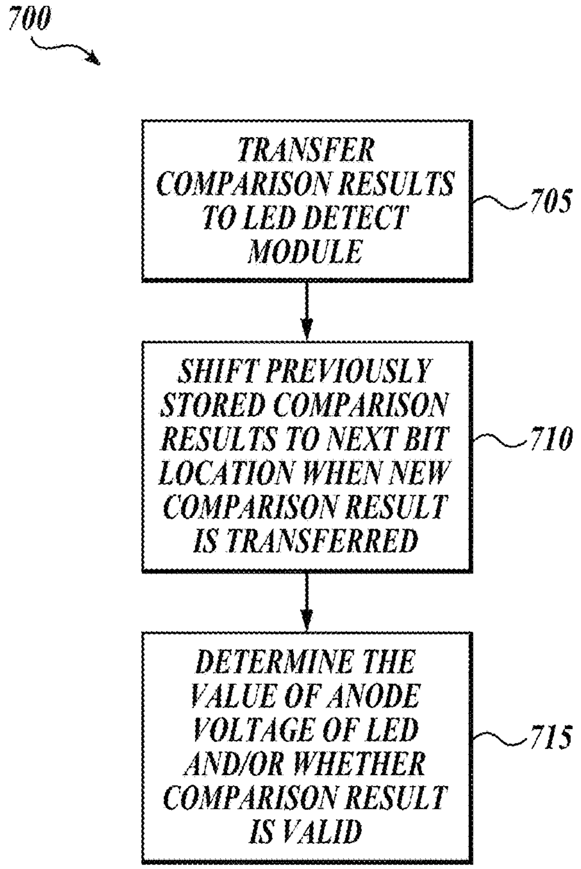
FIG. 7 is another method of detecting a short circuit, open circuit, and/or anode voltage of an LED of a micro-LED display system, in accordance with the present technology.

FIG. 7 is another a method of detecting a short circuit, open circuit, and/or anode voltage of an LED of a micro-LED display system, in accordance with the present technology. In some embodiments, the LED detect module includes a shifter (such as module Method 2). In some embodiments, the method 700 may be carried out with a micro-LED display panel (such as micro-LED display panel 300), including a resistor ladder (such as resistor ladder 305) a plurality of rows of LEDs (as shown in FIG. 1), and an LED detect module (such as LED detector module 330). In some embodiments, each LED of the row of LEDs includes a channel (such as channel 0, . . . , channel m, . . . , channel M). Each channel may include a feedback path (such as feedback path 410), a column driver (such as column driver 310) including a DAC (such as DAC 320) a voltage comparator (such as voltage comparator 345A), and a data latch (such as data latch 315). In such embodiments, the shifter may shift the previously stored results to a next bit location before a new comparison result is stored.

In some embodiments, method 700 occurs after method 500. In different embodiments, the method 700 may include additional steps or may be executed with less steps than shown in the flow chart.

In block 705, the comparison results are transferred to the LED detect module.

In block 710, the LED detect module shifts previously stored comparison results to a next bit location before (or when) a new comparison result is transferred. In some embodiments, the LED detect module includes a shifter.

In block 715, the value of the anode voltage of the LED is determined and/or it is determined whether the comparison result is valid, as shown and explained in FIGS. 3A-3C.

Figure 8:
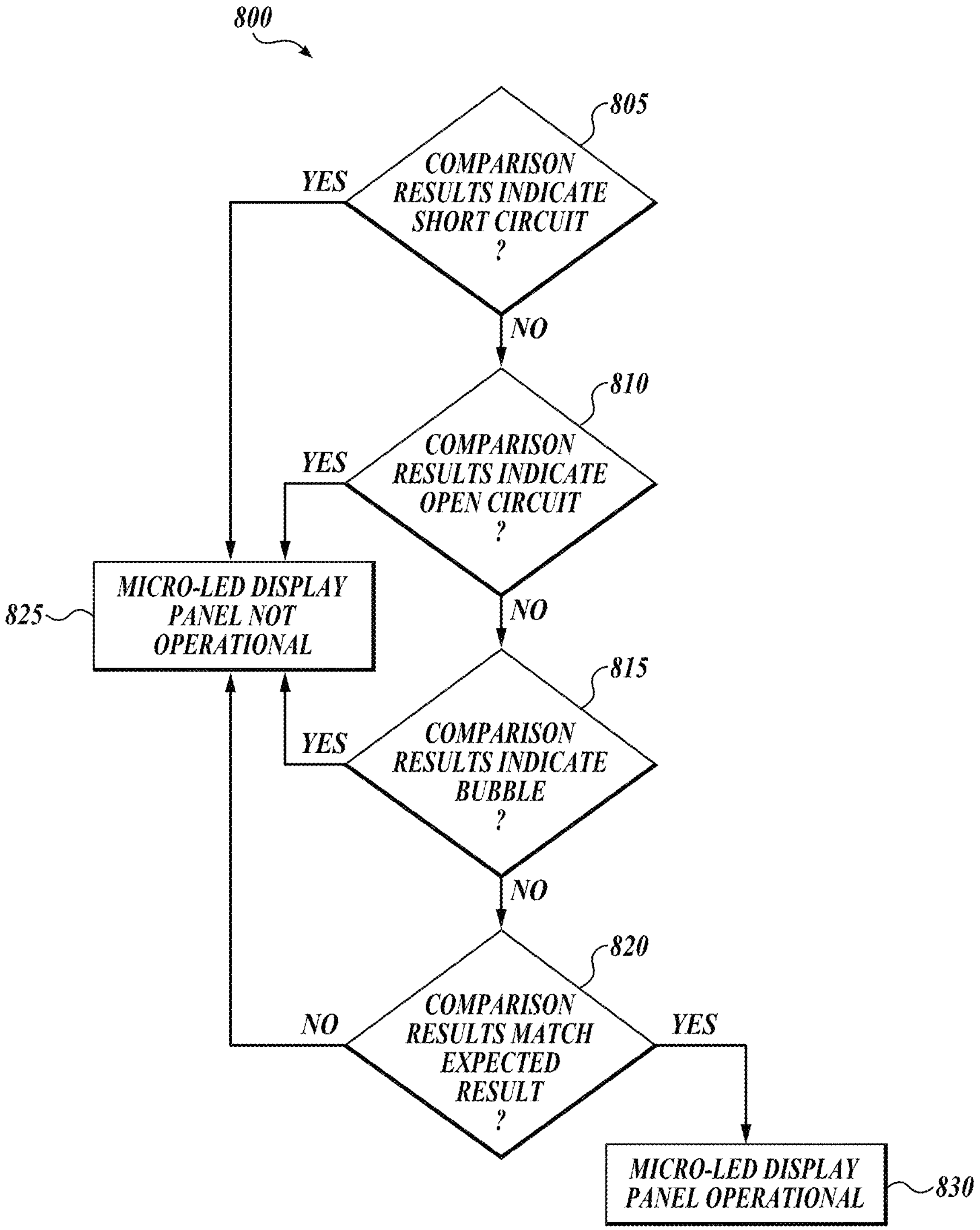
FIG. 8 is another method of detecting a short circuit, open circuit, and/or anode voltage of an LED of a micro-LED display system, in accordance with the present technology.

FIG. 8 is another method of detecting a short circuit, open circuit, and/or anode voltage of an LED of a micro-LED display system, in accordance with the present technology. In some embodiments, the method 800 may be carried out with a micro-LED display panel (such as micro-LED display panel 300), including a resistor ladder (such as resistor ladder 305) a plurality of rows of LEDs (as shown in FIG. 1), and an LED detect module (such as LED detector module 330). In some embodiments, each LED of the row of LEDs includes a channel (such as channel 0, channel m, channel M). Each channel may include a feedback path (such as feedback path 410), a column driver (such as column driver 310) including a DAC (such as DAC 320) a voltage comparator (such as voltage comparator 345A), and a data latch (such as data latch 315).

In some embodiments, method 800 occurs after method 600 or method 700.

In decision block 805, it is determined whether the comparison results indicate a short circuit. In some embodiments, a short circuit is indicated when all 16 bits of the comparison results are at "0" as shown in FIG. 3C. If it is determined that there is not short, the method proceeds to block 810.

In decision block 810, it is determined whether the comparison results indicate an open circuit. In some embodiments, an open circuit is indicated when all 16 bits of the comparison results are at "1" as shown in FIG. 3C. If it is determined that there is not an open circuit, the method proceeds to block 815.

In decision block 815, it is determined whether the comparison results indicate a bubble (or voltage bubble). In some embodiments, a bubble is indicated when a bit is unexpectedly at "0" or "1" as shown in FIG. 3C. If it is determined that there is not a voltage bubble, the method proceeds to block 820.

In decision block 820, it is determined whether the comparison results match an expected result. An example expected result, showing an LED voltage between v_9 and v_10 is shown in FIG. 3C. If it is determined that the comparison results match the expected results, the method proceeds to block 830.

In block 830, the micro-LED display panel is declared to be operational.

Returning to decision block 805, if the comparison results indicate a short circuit, the method proceeds to block 825.

In block 825, the micro-LED display panel is declared to be not operational.

Returning to decision block 810, if the comparison results indicate an open circuit, the method proceeds to block 825.

In block 825, the micro-LED display panel is declared to be not operational.

Returning to decision block 815, if the comparison results indicate a voltage bubble, the method proceeds to block 825.

In block 825, the micro-LED display panel is declared to be not operational.

Returning to decision block 820, if the comparison results do not match an expected result, the method proceeds to block 825.

In block 825, the micro-LED display panel is declared to be not operational.

It should be understood that all methods 500, 600, 700, and 800 should be interpreted as merely representative. In some embodiments, process blocks of all methods 500, 600, 700, and 800 may be performed simultaneously, sequentially, in a different order, or even omitted, without departing from the scope of this disclosure.

What is claimed is:

1. A micro-light-emitting diode (micro-LED) display comprising:

a resistor ladder;

a plurality of rows of light-emitting diodes (LEDs), each LED of the LEDs in a row including a channel wherein each channel includes:

a column driver comprising a digital to analog converter (DAC) and the voltage comparator, wherein the DAC is configured to receive a plurality of voltage inputs from the resistor ladder and to provide a corresponding plurality of voltage outputs to an input of a voltage comparator, and wherein the voltage comparator is configured to successively compare individual voltage outputs of the plurality of voltage outputs received from the DAC with an anode voltage of each LED;

a transistor configured to enable the anode voltage of each LED to be fed to the voltage comparator;

a data latch configured to store comparison results from the voltage comparator, wherein each comparison results correspond to a voltage output of the plurality of voltage outputs received from the DAC;

a shifter configured to shift previously stored comparison results to a next bit location before a new comparison result is stored by the data latch, wherein the shifter is configured for visualizing a bubble in the comparison results;

wherein the bubble is at least one bit with an unexpected value; and an LED detect module configured to determine whether the micro-LED display is operational based on the comparison results, wherein the micro-LED display is declared as not operational when the comparison results indicate the bubble, and wherein the bubble is indicated when a voltage is unexpectedly high among a plurality of low voltage readings of a bit preceding the bubble and a bit following the bubble or unexpectedly low among a plurality of high voltage readings of a bit preceding the bubble and a bit following the bubble.

2. The micro-LED display of claim 1, wherein the comparison results are 16-bit data.

3. The micro-LED display of claim 2, wherein the data latch is a 16-bit data latch.

4. The micro-LED display of claim 2, wherein the LED detect module comprises:

an adder configured to accumulate the comparison results of each LED into a 5-bit data result.

5. The micro-LED display of claim 2, wherein the plurality of voltage outputs is sixteen output voltages.

6. The micro-LED display of claim 2, wherein the DAC is a 4-bit DAC.

7. The micro-LED display of claim 1, wherein the micro-LED display is declared as not operational when the comparison results indicate a short circuit.

8. The micro-LED display of claim 1, wherein the micro-LED display is declared as operational when the comparison results correspond to an expected result.

9. The micro-LED display of claim 1, wherein the micro-LED display is declared as not operational when the comparison results indicate an open circuit.

10. A method of detecting anode voltage of a micro-light-emitting diode (micro-LED) display including a plurality of rows of light-emitting diodes (LEDs) wherein each LED of a row of LEDs includes a channel, and a transistor configured to feed an anode voltage of each LED the method comprising:

enabling the row of LEDs;

feeding an anode voltage of an LED to an input of a voltage comparator;

selecting one voltage from a plurality of voltages and outputting the one voltage to a voltage comparator;

outputting a corresponding plurality of voltage outputs with the DAC to a voltage comparator;

comparing the anode voltage with the one voltage selected;

capturing a 1-bit comparison result of all channels of the micro-LED display with a data latch;

shifting previously stored comparison results to a next bit location before a new comparison result is stored by the data latch, wherein shifting the previously stored comparison results visualizes a bubble in the comparison results;

wherein the bubble is at least one bit with an unexpected value; and determining whether the micro-LED display is operational based on the comparison results, wherein the micro-LED display is declared as not operational when the comparison results indicate the bubble, and wherein the bubble is indicated when a voltage is unexpectedly high among a plurality of low voltage readings of a bit preceding the bubble and a bit following the bubble or unexpectedly low among a plurality of high voltage readings of a bit preceding the bubble and a bit following the bubble.

11. The method of claim 10, wherein determining whether the micro-LED display is operational comprises:

adding the comparison results of each LED into a 5-bit data result.

12. The method of claim 10, wherein the micro-LED display is declared as not operational when the comparison results indicate a short circuit.

13. The method of claim 10, wherein the micro-LED display is declared as operational when the comparison results correspond to an expected result.

14. The method of claim 10, wherein the micro-LED display is not operational when the comparison results indicate an open circuit.

15. The method of claim 10, the method further comprising:

after transferring the comparison results to an LED detect module for each row of LEDs, transferring the comparison results to a serial bus.

16. The method of claim 10, wherein the comparison results are 16-bit data.

* * * * *